L. A. THORNBURG.
GLASS MAKING FURNACE.
APPLICATION FILED NOV. 20, 1909. RENEWED JUNE 14, 1913.
1,127,115.
Patented Feb. 2, 1915.
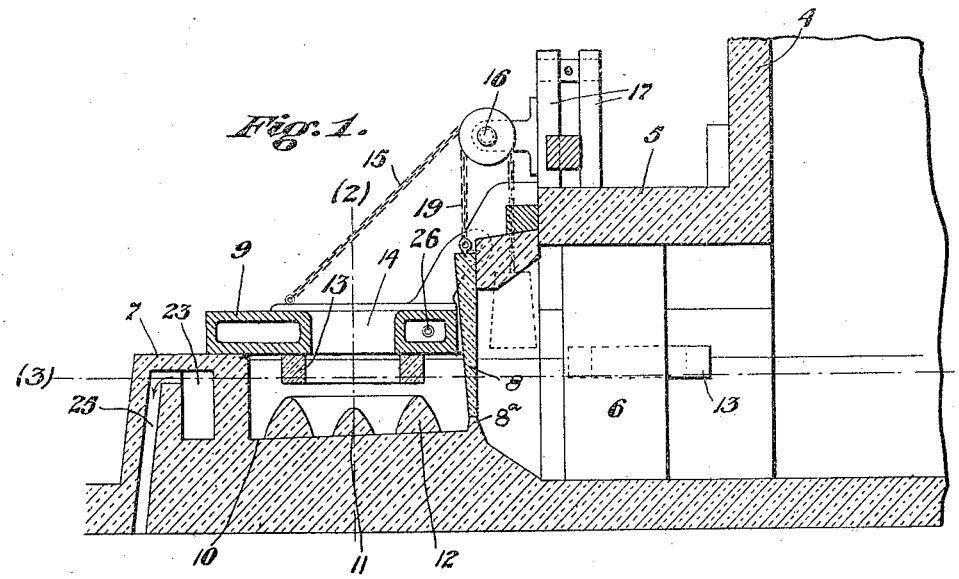
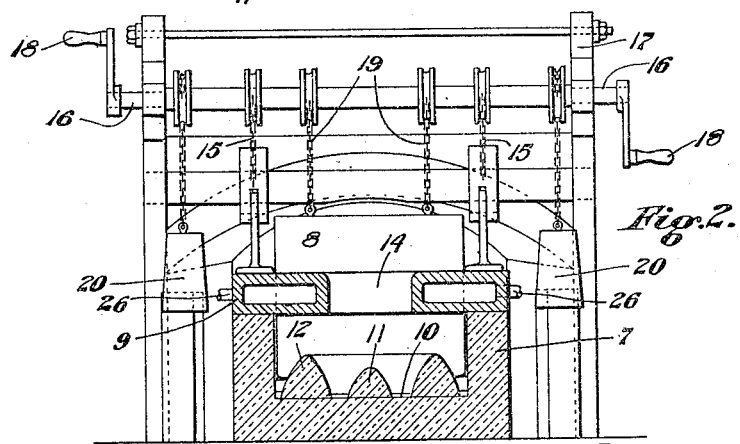
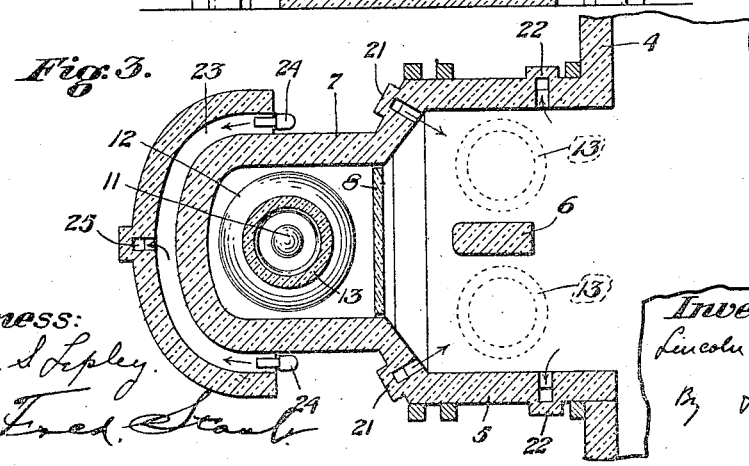

UNITED STATES PATENT OFFICE.

LINCOLN A. THORNBURG, OF ARNOLD, PENNSYLVANIA, ASSIGNOR TO AMERICAN WINDOW GLASS MACHINE COMPANY, OF PITTSBURGH, PENNSYLVANIA, A CORPORATION OF NEW JERSEY.

GLASS-MAKING FURNACE.

1,127,115. Specification of Letters Patent. Patented Feb. 2, 1915.

Application filed November 20, 1909, Serial No. 529,040. Renewed June 14, 1913. Serial No. 773,760.

*To all whom it may concern:*

Be it known that I, LINCOLN A. THORNBURG, a citizen of the United States, residing at Arnold, in the State of Pennsylvania, have invented certain new and useful Improvements in Glass-Making Furnaces, of which the following is a specification.

My invention relates especially to the art of drawing glass cylinders for the purpose of making window glass and the like and is particularly concerned with the provision of an improved receptacle for containing glass being drawn, and other means to improve the quality, uniformity, and facility of production of cylinders or other hollow articles, the primary objects being to control the molten glass and temperature conditions, and facilitate the clearing out of residue left after a cylinder is cut off.

I have illustrated the invention in one form in the accompanying drawing, in which—

Figure 1 is a central vertical section through an improved forehearth embodying my invention; Fig. 2 is a vertical section on the line 2 of Fig. 1, and Fig. 3 is a plan section on the level of line 3 of Fig. 1.

It is well known in this art that there are certain advantages in drawing from a shallow body of glass, and the most successful practice has been the drawing from shallow pots; also that it is difficult to control the temperature of the body of glass; also that it is necessary to quickly remove the cold residue left after the cutting off of a cylinder.

In my invention, I draw out of a forehearth in direct communication with the whole body of the glass in the melting tank, but I arrange it that the glass at the drawing point is of comparatively shallow depth, is securely confined against movement, and is sufficiently cool for rapid drawing; meanwhile, the temperature conditions are kept uniform and the residue left after cutting off the cylinder is immediately removed and melted back at another place and without interrupting the drawing operations. Thus in the drawing, 4 represents part of a large melting tank, and 5 is a forehearth projecting therefrom and having its mouth divided by partition 6. This forehearth also has a further outward extension 7 separated from the principal chamber by means of a clay damper 8, and forming the drawing chamber. It is covered by a hollow top stone 9 and its bottom is somewhat higher than the bottom of the melting back chamber 5, which has its bottom on the same level with that of the tank. On the bottom of the drawing chamber centrally of the drawing position I place a boss 11 for the purpose of chilling the glass in the center and also an annular fixed ring 12 on the bottom to keep the flow of glass more steady and the temperature uniform. Directly above this annular boss, I use a floating ring 13 surrounding the opening 14 in the top stone 9 through which the cylinder is drawn. Several of these rings are provided, so that after drawing the cylinder out of one of them and cutting off the residue therein, the ring may be pushed out into the melting back chamber 5 and a new ring introduced into the drawing chamber, thus immediately removing all cold glass and making ready for the next draw.

The top stone 9 is hinged to the forehearth and by means of a chain 15 and wheel on shaft 16 in the framework 17, the topstone can be raised by means of a handle 18. At the same time by a similar chain 19 the stop door or damper 8 is also lifted simultaneously, both these parts being balanced by counterweights 20 also hung from shaft 16.

The forehearth 5 may be specially heated by burner flues 21, coöperating with the downtake flues 22. The drawing chamber has practically a semicircular front and is covered by a double wall leaving a heat insulating chamber 23, and in this I may provide extra heat by burners 24 and downtake flue 25. The drawing chamber is also preferably deeper at the front side next to the double wall, and it is also separated from the melting back chamber by a breaker 8ª across the mouth under the stop door 8. All these features are for more perfectly preserving a uniform temperature during the draw. The hollow topstone 9 may be kept cool by water circulating through pipes 26. This forehearth is to be used with any convenient drawing mechanism, such as that shown in my co-pending application No. 529,039, filed November 20th, 1909, and it will be understood that in the operation the top stone 9 and damper 8 are raised, a ring 13 is drawn into place over the annular boss 12 and the top stone and damper lowered, the top stone being in contact and holding the ring 13 in place, and the drawing proceeds as usual by dipping in the bait and lifting upwardly. After the cylinder is drawn and cut off, the top stone and damper being raised, the ring 13 containing the residue of glass is pushed outward into the melting back chamber on one side of the partition 6, and a new ring 13 is immediately drawn in from the other side of this partition and the process is repeated. Otherwise it will be understood that I may use floating pots instead of the rings 13 manipulating them in the same way. The melting back thus takes place in the hot part of the melting furnace or forehearth and not in the drawing chamber, and the removal of the old ring and cold glass automatically draws in fresh glass, the temperature conditions being the same not only for each draw but throughout the draw, and it being possible to draw as long a cylinder as desired; the various advantages of the device will readily occur to those familiar with the art.

Having thus described my invention and illustrated its use, I claim:

1. A furnace having a drawing chamber extension in communication with the furnace tank, said chamber having on its bottom a central chilling boss, and a bottom ring surrounding said boss, substantially as described.

2. A furnace having a drawing chamber extension in communication with the furnace tank, said chamber having on its bottom a central chilling boss, and a ring surrounding said boss, together with a floating member arranged to be brought into position over said boss, substantially as described.

3. A furnace having a horizontal drawing chamber extension in communication with the furnace tank, said chamber having on its bottom a central chilling boss, a ring surrounding said boss, together with a floating member arranged to be brought into position over said boss, and a movable topstone for said chamber, substantially as described.

4. A glass furnace having a forehearth, and the forehearth having a drawing chamber extension, a vertically movable damper for controlling the communication between the forehearth and the drawing chamber, a vertically movable topstone for the drawing chamber, and means for simultaneously moving the damper and the topstone, together with means for cooling the topstone, substantially as described.

5. A glass furnace having a forehearth, the forehearth having a horizontal drawing extension hearth, said hearth extension being of less depth than the forehearth proper but of increasing depth toward its outer end; substantially as described.

6. A glass furnace having a forehearth, the forehearth having a horizontal drawing extension hearth, said hearth extension being of less depth than the forehearth proper but of increasing depth toward its outer end, and the bottom of the drawing extension having glass chilling means projecting upwardly therefrom; substantially as described.

7. A glass furnace having a forehearth, the forehearth having a horizontal drawing extension hearth, said hearth extension being of less depth than the forehearth proper but of increasing depth toward its outer end, the front wall of said extension having a heating chamber therein; substantially as described.

8. A glass furnace having a forehearth, the forehearth having a horizontal drawing extension hearth, said hearth extension being of less depth than the forehearth proper but of increasing depth toward its outer end, and the bottom of the drawing extension having glass chilling means projecting upwardly therefrom, together with a floating member arranged to be brought into position over the chilling means; substantially as described.

9. A glass furnace having a horizontal drawing extension, said extension being of increasing depth toward its outer end; substantially as described.

10. A glass furnace having a drawing extension or forehearth at one end, said extension having its bottom wall slanting downwardly toward its outer end to thereby provide for a gradually increasing depth of the glass containing chamber of the extension, substantially as described.

In testimony whereof I have hereunder signed my name in the presence of the two subscribed witnesses.

LINCOLN A. X THORNBURG.
his mark

Witnesses:
CLARA THORNBURG,
CHAS. S. LEFLEY.